United States Patent
Kim (10) Patent No.: US 12,258,010 B2
(45) Date of Patent: Mar. 25, 2025

(54) APPARATUS FOR PREVENTING COLLISION AT INTERSECTION AND METHOD THEREOF

(71) Applicants: Hyundai Motor Company, Seoul (KR); Kia Corporation, Seoul (KR)

(72) Inventor: Keun Jin Kim, Seongnam-si (KR)

(73) Assignees: Hyundai Motor Company, Seoul (KR); Kia Corporation, South (KR)

( * ) Notice: Subject to any disclaimer, the term of this patent is extended or adjusted under 35 U.S.C. 154(b) by 191 days.

(21) Appl. No.: 17/979,170

(22) Filed: Nov. 2, 2022

(65) Prior Publication Data

US 2023/0264691 A1     Aug. 24, 2023

(30) Foreign Application Priority Data

Feb. 21, 2022   (KR) ........................ 10-2022-0022512

(51) Int. Cl.
*B60W 30/095*     (2012.01)
(52) U.S. Cl.
CPC ... *B60W 30/0956* (2013.01); *B60W 2420/403* (2013.01); *B60W 2420/54* (2013.01); *B60W 2552/05* (2020.02); *B60W 2552/45* (2020.02); *B60W 2552/53* (2020.02); *B60W 2554/4026* (2020.02); *B60W 2554/4029* (2020.02); *B60W 2554/4045* (2020.02); *B60W 2554/804* (2020.02); *B60W 2555/60* (2020.02); *B60W 2556/40* (2020.02)
(58) Field of Classification Search
CPC ....... B60W 30/0956; B60W 2420/403; B60W 2420/54; B60W 2552/05; B60W 2552/45; B60W 2552/53; B60W 2554/4026; B60W 2554/4029; B60W 2554/4045; B60W 2554/804; B60W 2555/60; B60W 2556/40; B60W 50/0097; B60W 30/18159; B60W 30/09; B60W 30/095; B60W 30/0953; B60W 30/18145; B60W 30/18154; B60W 40/02; B60W 40/10; B60W 50/0098; G08G 1/166; G08G 1/04; G08G 1/096725; G08G 1/097

See application file for complete search history.

(56) References Cited

U.S. PATENT DOCUMENTS

| | | | |
|---|---|---|---|
| 9,896,094 B2 * | 2/2018 | Nishimura | .......... B60W 30/095 |
| 10,643,474 B2 * | 5/2020 | Yamada | ................. G06V 20/56 |

(Continued)

*Primary Examiner* — Frederick M Brushaber
(74) *Attorney, Agent, or Firm* — Slater Matsil, LLP (57) ABSTRACT

An embodiment apparatus for preventing a collision at an intersection includes a communication device configured to receive map information, location information, an image around a vehicle, ultrasonic sensor data, or traffic light information, a right turn prediction device configured to predict whether the vehicle will make a right turn at the intersection, based on the map information, the location information, or the image around the vehicle, a right turn performance determination device configured to determine whether the vehicle is able to make the right turn safely, based on the image around the vehicle, the ultrasonic sensor data, or the traffic light information, in response to a prediction that the vehicle will make the right turn at the intersection, and a controller configured to control the vehicle according to the determination of whether the vehicle is able to make the right turn safely.

20 Claims, 7 Drawing Sheets

(56) References Cited

U.S. PATENT DOCUMENTS

| | | | | |
|---|---|---|---|---|
| 11,066,073 | B2* | 7/2021 | Ishioka | B60W 30/09 |
| 11,433,894 | B2* | 9/2022 | Yamaguchi | B60W 60/00272 |
| 2014/0244157 | A1* | 8/2014 | Tan | G08G 1/167 |
| | | | | 701/423 |
| 2017/0193384 | A1* | 7/2017 | Mudalige | G08G 1/161 |
| 2019/0009819 | A1* | 1/2019 | Ishioka | B60W 30/18163 |
| 2019/0016334 | A1* | 1/2019 | Mafrica | G01C 21/3461 |
| 2020/0160699 | A1* | 5/2020 | Annapureddy | G06V 20/584 |
| 2021/0001889 | A1* | 1/2021 | Furukawa | G06V 20/586 |

* cited by examiner

APPARATUS FOR PREVENTING COLLISION AT INTERSECTION AND METHOD THEREOF

CROSS-REFERENCE TO RELATED APPLICATIONS

This application claims the benefit of Korean Patent Application No. 10-2022-0022512, filed on Feb. 21, 2022, which application is hereby incorporated herein by reference.

TECHNICAL FIELD

The present disclosure relates to an apparatus for preventing a collision at an intersection and a method thereof.

BACKGROUND

In general, when traffic lights at an intersection do not turn on a signal allowing a vehicle to go straight or make a left turn, the vehicle which wants to go straight or make the left turn may not enter the intersection, although the traffic lights at the intersection turn on a walk stop signal before the vehicle enters the intersection.

On the other hand, traffic lights for a vehicle at the intersection often do not separately turn on a signal allowing the vehicle to make a right turn. When the traffic lights at the intersection turn on the walk stop signal before the vehicle enters the intersection, a vehicle which wants to make a right turn at the intersection may enter the intersection to make the right turn, unless it interferes with the traffic of other vehicles.

Meanwhile, in general, when traffic lights at a crosswalk in front of the vehicle turn on a walk signal, the vehicle may not invade and travel on the crosswalk.

On the other hand, although traffic lights at a crosswalk a right turning vehicle meets when turning to the right after entering the intersection turn on a walk signal, when there is no pedestrian on the crosswalk, the right turning vehicle may perform driving passing through the crosswalk after entering the intersection to complete a right turn.

As such, due to the specificity of the regulations the right turning vehicle should comply with, as the right turning vehicle is able to pass through a crosswalk corresponding to traffic lights which turn on a walk signal, a collision between the right turning vehicle and a pedestrian on the crosswalk occurs.

In addition, because there is a possibility of collision between the right turning vehicle and a vehicle entering a road such as the road the right turning vehicle enters in another direction of the intersection, a driver of the right turning vehicle should pay attention to the forward or left direction as well as the direction of the right turn.

Meanwhile, when the walk signal is about to end, a pedestrian bored by waiting for a next walk signal after missing a previous walk signal may quickly enter a crosswalk from a sidewalk on the right side of the right turning vehicle, and it is often difficult for the driver of the right turning vehicle to recognize the pedestrian.

Due to the above factors, an accident of collision between the right turning vehicle and the pedestrian frequently occurs.

Meanwhile, in a country or an area capable of selecting left-hand traffic, an accident of collision between a left turning vehicle and a pedestrian occurs.

SUMMARY

The present disclosure relates to an apparatus for preventing a collision at an intersection and a method thereof. Particular embodiments relate to an apparatus for preventing a collision at an intersection to prevent a collision between a vehicle and a pedestrian at the intersection and a method thereof.

Embodiments of the present disclosure can solve problems occurring in the prior art while advantages achieved by the prior art are maintained intact.

An embodiment of the present disclosure provides an apparatus for preventing a collision at an intersection to determine whether a vehicle is able to make a right turn at the intersection safely and control the vehicle to be stopped to prevent a collision between a pedestrian and the vehicle, when it is determined that the vehicle is unable to make the right turn, to improve safety of the pedestrian and a driver and a method thereof.

Another embodiment of the present disclosure provides an apparatus for preventing a collision at an intersection to determine whether a vehicle will enter the intersection, using an image around the vehicle, which is obtained using an existing camera or the like provided in the vehicle, determine whether there is a sidewalk on the right side of the vehicle or a roadside zone on the right side of the vehicle, determine whether the vehicle will make a right turn, and determine presence of a pedestrian on the sidewalk on the right side of the vehicle or the like to prevent the collision at the intersection without increasing unnecessary costs and without increasing a weight of the vehicle and a method thereof.

Another embodiment of the present disclosure provides an apparatus for preventing a collision at an intersection to calculate a relative speed between a vehicle and a pedestrian, using an existing ultrasonic sensor provided in the vehicle, and determine a possibility of collision between the vehicle and the pedestrian to facilitate sophisticated determination of the possibility of collision and a method thereof.

The technical problems solvable by embodiments of the present disclosure are not limited to the aforementioned problems, and any other technical problems not mentioned herein will be clearly understood from the following description by those skilled in the art to which the present disclosure pertains.

According to an embodiment of the present disclosure, an apparatus for preventing a collision at an intersection may include a communication device that receives at least one of map information, location information, an image around a vehicle, ultrasonic sensor data, or traffic light information, a right turn prediction device that predicts whether the vehicle will make a right turn at the intersection, based on at least one of the map information, the location information, or the image around the vehicle, a right turn performance determination device that determines whether the vehicle is able to make the right turn safely, based on at least one of the image around the vehicle, the ultrasonic sensor data, or the traffic light information, when it is predicted that the vehicle will make the right turn at the intersection, and a controller that controls the vehicle, depending on the result of determining whether the vehicle is able to make the right turn safely.

In an embodiment, the right turn prediction device may determine whether the vehicle will enter the intersection, based on at least one of the map information or the location information, may determine whether the vehicle travels in a right turn lane being a right edge of a road, based on the image around the vehicle, when it is determined that the vehicle will enter the intersection, and may predict that the vehicle will make the right turn at the intersection, when it is determined that the vehicle travels in the right turn lane.

In an embodiment, the right turn prediction device may determine that the vehicle travels in the right turn lane, when it is determined that there is a sidewalk on the right side of the vehicle or a roadside zone on the right side of the vehicle, based on the image around the vehicle.

In an embodiment, the right turn prediction device may determine that there is the sidewalk on the right side of the vehicle, when it is identified that a curbstone is located at the right side of the vehicle, based on the image around the vehicle.

In an embodiment, the right turn prediction device may determine that there is the roadside zone on the right side of the vehicle, when it is identified that a safety sign about the safety of a pedestrian is located at the right side of the vehicle.

In an embodiment, the safety sign may include at least one of a solid yellow line, a solid white line, or a bicycle road marking.

In an embodiment, the right turn performance determination device may determine that the vehicle is unable to make the right turn safely, when it is identified that pedestrian traffic lights corresponding to a crosswalk located at the intersection will turn on a walk signal during a predetermined period immediately before the vehicle will enter the intersection until immediately after the vehicle will exit the intersection, based on the traffic light information, when it is predicted that the vehicle will make the right turn at the intersection. The controller may control the vehicle to be stopped before the vehicle enters the crosswalk.

In an embodiment, the right turn performance determination device may determine whether there is a pedestrian on a sidewalk on the right side of the vehicle or on a roadside zone on the right side of the vehicle, based on the image around the vehicle, when it is identified that pedestrian traffic lights corresponding to a crosswalk located at the intersection will not turn on a walk signal during the predetermined period immediately before the vehicle will enter the intersection until immediately after the vehicle will exit the intersection, based on the traffic light information, when it is predicted that the vehicle will make the right turn at the intersection.

In an embodiment, the right turn performance determination device may calculate a relative speed between the vehicle and the pedestrian, based on the ultrasonic sensor data, and may determine whether the vehicle will collide with the pedestrian, based on the calculated relative speed, when it is determined that there is the pedestrian on the sidewalk on the right side of the vehicle or the roadside zone on the right side of the vehicle.

In an embodiment, the right turn performance determination device may determine that the vehicle is unable to make the right turn safely, when it is determined that the vehicle would collide with the pedestrian. The controller may control the vehicle to be stopped before the vehicle enters the crosswalk.

According to another embodiment of the present disclosure, a method for preventing a collision at an intersection may include receiving, by a communication device, at least one of map information, location information, an image around a vehicle, ultrasonic sensor data, or traffic light information, predicting, by a right turn prediction device, whether the vehicle will make a right turn at the intersection, based on at least one of the map information, the location information, or the image around the vehicle, determining, by a right turn performance determination device, whether the vehicle is able to make the right turn safely, based on at least one of the image around the vehicle, the ultrasonic sensor data, or the traffic light information, when it is predicted that the vehicle will make the right turn at the intersection, and controlling, by a controller, the vehicle, depending on the result of determining whether the vehicle is able to make the right turn safely.

In an embodiment, the predicting of whether the vehicle will make the right turn at the intersection may include determining, by the right turn prediction device, whether the vehicle will enter the intersection, based on at least one of the map information or the location information, determining, by the right turn prediction device, whether the vehicle travels in a right turn lane being a right edge of a road, based on the image around the vehicle, when it is determined that the vehicle will enter the intersection, and predicting, by the right turn prediction device, that the vehicle will make the right turn at the intersection, when it is determined that the vehicle travels in the right turn lane.

In an embodiment, the determining of whether the vehicle travels in the right turn lane may include determining, by the right turn prediction device, that the vehicle travels in the right turn lane, when it is determined that there is one of a sidewalk on the right side of the vehicle or a roadside zone on the right side of the vehicle, based on the image around the vehicle.

In an embodiment, the determining of whether the vehicle travels in the right turn lane may include determining, by the right turn predicting device, that there is the sidewalk on the right side of the vehicle, when it is identified that a curbstone is located at the right side of the vehicle, based on the image around the vehicle.

In an embodiment, the determining of whether the vehicle travels in the right turn lane may include determining, by the right turn predicting device, that there is the roadside zone on the right side of the vehicle, when it is identified that a safety sign about the safety of a pedestrian is located at the right side of the vehicle.

In an embodiment, the safety sign may include at least one of a solid yellow line, a solid white line, or a bicycle road marking.

In an embodiment, the determining of whether the vehicle is able to make the right turn safely may include determining, by the right turn performance determination device, that the vehicle is unable to make the right turn safely, when it is identified that pedestrian traffic lights corresponding to a crosswalk located at the intersection will turn on a walk signal during a predetermined period immediately before the vehicle will enter the intersection until immediately after the vehicle will exit the intersection, based on the traffic light information, when it is predicted that the vehicle will make the right turn at the intersection. The controlling of the vehicle may include controlling, by the controller, the vehicle to be stopped before the vehicle enters the crosswalk.

In an embodiment, the determining of whether the vehicle is able to make the right turn safely may include determining, by the right turn performance determination device, whether there is a pedestrian on a sidewalk on the right side of the vehicle or on a roadside zone on the right side of the vehicle, based on the image around the vehicle, when it is identified that pedestrian traffic lights corresponding to a crosswalk located at the intersection will not turn on a walk signal during the predetermined period immediately before the vehicle will enter the intersection until immediately after the vehicle will exit the intersection, based on the traffic light information, when it is predicted that the vehicle will make the right turn at the intersection.

In an embodiment, the determining of whether the vehicle is able to make the right turn safely may include calculating, by the right turn performance determination device, a relative speed between the vehicle and the pedestrian, based on the ultrasonic sensor data, and determining, by the right turn performance determination device, whether the vehicle will collide with the pedestrian, based on the calculated relative speed, when it is determined that there is the pedestrian on the sidewalk on the right side of the vehicle or the roadside zone on the right side of the vehicle.

In an embodiment, the determining of whether the vehicle is able to make the right turn safely further may include determining, by the right turn performance determination device, that the vehicle is unable to make the right turn safely, when it is determined that the vehicle would collide with the pedestrian. The controlling may include controlling, by the controller, the vehicle to be stopped before the vehicle enters the crosswalk.

BRIEF DESCRIPTION OF THE DRAWINGS

The above and other objects, features and advantages of embodiments of the present disclosure will be more apparent from the following detailed description taken in conjunction with the accompanying drawings, in which.

DETAILED DESCRIPTION OF ILLUSTRATIVE EMBODIMENTS

Hereinafter, some embodiments of the present disclosure will be described in detail with reference to the exemplary drawings. In adding the reference numerals to the components of each drawing, it should be noted that the identical or equivalent component is designated by the identical numeral even when it is displayed on other drawings. Further, in describing the embodiments of the present disclosure, a detailed description of well-known features or functions will be omitted in order not to unnecessarily obscure the gist of the present disclosure.

In describing the components of the embodiments according to the present disclosure, terms such as first, second, "A", "B", (a), (b), and the like may be used. These terms are only used to distinguish one element from another element, but do not limit the corresponding elements irrespective of the order or priority of the corresponding elements. Furthermore, unless otherwise defined, all terms including technical and scientific terms used herein are to be interpreted as is customary in the art to which this invention belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

Hereinafter, embodiments of the present disclosure will be described in detail with reference to FIGS. 1 to 6.

Figure 1:
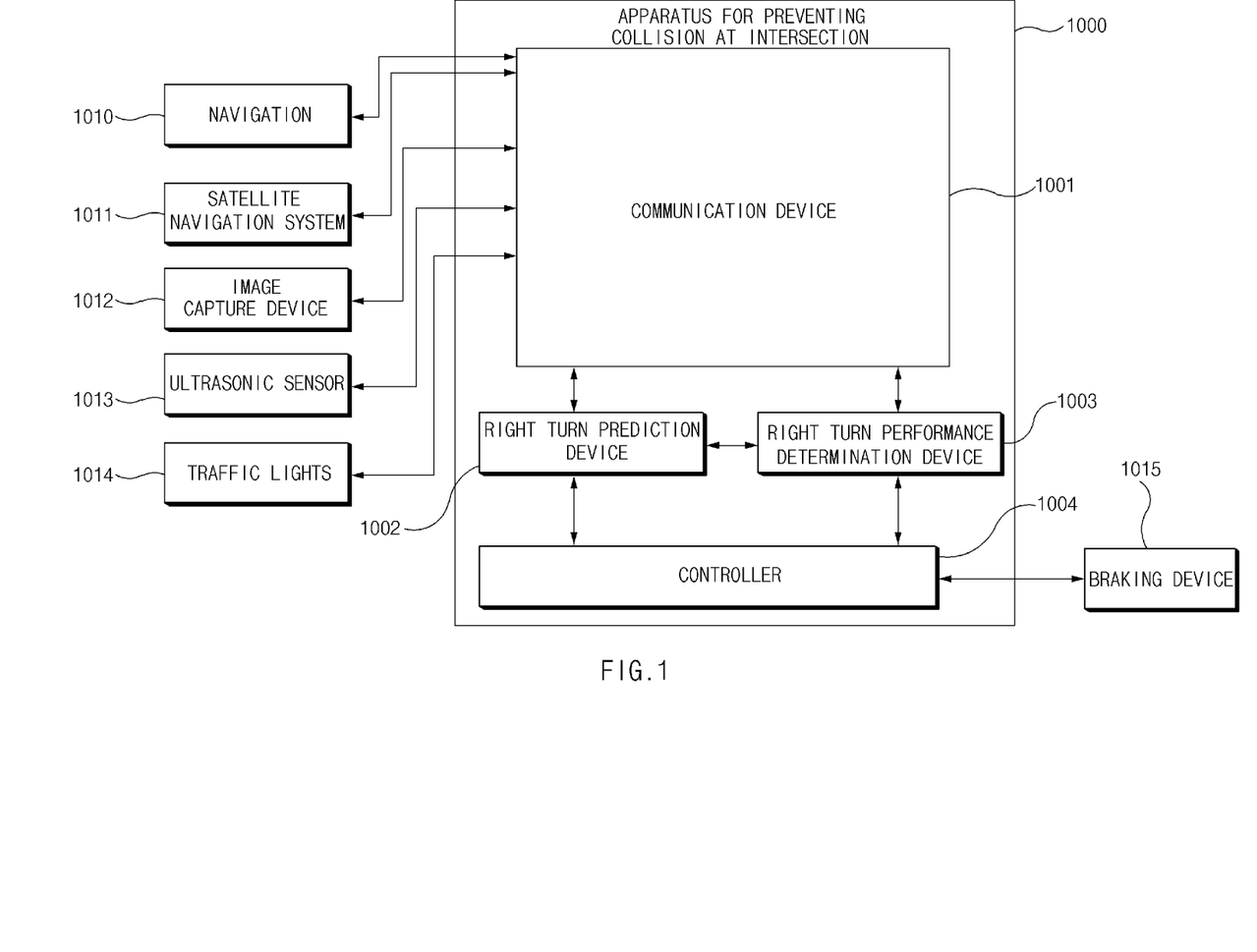
FIG. 1 is a drawing illustrating an apparatus for preventing a collision at an intersection according to an embodiment of the present disclosure.

FIG. 1 is a drawing illustrating an apparatus 1000 for preventing a collision at an intersection according to an embodiment of the present disclosure.

The apparatus 1000 for preventing the collision at the intersection according to an embodiment of the present disclosure may include a communication device 1001, a right turn prediction device 1002, a right turn performance determination device 1003, and a controller 1004.

Furthermore, the apparatus 1000 for preventing the collision at the intersection according to an embodiment of the present disclosure may include one or more elements which are not illustrated in the drawing.

The apparatus 1000 for preventing the collision at the intersection according to an embodiment of the present disclosure may be provided in a vehicle (hereinafter, the vehicle including the apparatus 1000 for preventing the collision at the intersection according to embodiments is referred to as a "host vehicle").

Herein, the host vehicle may include, but is not limited to, one of an electric vehicle (EV), a hybrid electric vehicle (HEV), a hydrogen electric vehicle, a plug-in hybrid electric vehicle (PHEV), or an internal combustion engine vehicle.

The apparatus 1000 for preventing the collision at the intersection according to an embodiment may include the communication device 1001.

Herein, the communication device 1001 may use, but is not limited to, a communication scheme such as a local interconnect network (LIN), a controller area network (CAN), a FlexRay communication bus, media oriented systems transport (MOST), dedicated short range communication (DSRC), cellular vehicle-to-everything (C-V2X), Wi-Fi, wireless broadband (WiBro), or worldwide interoperability for microwave access (WiMAX).

The communication device 1001 may communicate with one of the right turn prediction device 1002, the right turn performance determination device 1003, or the controller 1004 to transmit or receive information.

Furthermore, the communication device 1001 may communicate with one of a navigation 1010, a satellite navigation system 1011, an image capture device 1012, an ultrasonic sensor 1013, or traffic lights 1014 to transmit or receive information.

The communication device 1001 may receive map information from the navigation 1010.

Herein, the map information may include information about locations of a road and an intersection where a vehicle around the host vehicle may travel, information about a location of a crosswalk, and the like.

The navigation 1010 may include a navigation system provided in the host vehicle or may include a navigation application provided in a portable device including a smartphone capable of communicating with the host vehicle or the apparatus 1000 for preventing the collision at the intersection according to an embodiment. The navigation 1010 may communicate with the communication device 1001, the satellite navigation system 1011, the traffic lights 1014, or the like.

Detailed contents where the apparatus 1000 for preventing the collision at the intersection according to embodiments uses map information will be described in detail in a description of FIGS. 2 to 5.

The communication device 1001 may receive location information from the satellite navigation system 1011.

Herein, the location information may include information indicating a current location of the host vehicle.

For example, the apparatus 1000 for preventing the collision at the intersection according to an embodiment may determine whether the host vehicle will enter the intersection, based on map information or location information.

The satellite navigation system 1011 may include a system or device capable of identifying a location of the host vehicle and may include, but is not limited to, a system for identifying a location of the host vehicle using a satellite, for example, a global positioning system (GPS), Galileo, a global navigation satellite system (GLONASS), Beidou, a Guasi-Zenith satellite system (QZSS), or an Indian regional navigational satellite system (IRNSS).

The satellite navigation system 1011 may be provided in a portable device including a smartphone capable of communicating with the host vehicle or the apparatus 1000 for preventing the collision at the intersection according to an embodiment and may communicate with the communication device 1001, the navigation 1010, or the like.

Meanwhile, in describing an embodiment of the present disclosure, the satellite navigation system 1011 is described as an example of the system or device for identifying the location or the location information of the host vehicle. However, the system or device capable of identifying the location or the location information of the host vehicle is not limited thereto. It is obvious that various ways of identifying a location without using a satellite are applicable to an embodiment of the present disclosure.

Detailed contents where the apparatus 1000 for preventing the collision at the intersection according to embodiments uses location information will be described in detail in a description of FIGS. 2 to 5.

The communication device 1001 may receive an image around the host vehicle from the image capture device 1012.

Herein, the image around the host vehicle may include one of an image in front of the host vehicle, an image at the left side of the host vehicle, an image at the right side of the host vehicle, or an image behind the host vehicle.

For example the image around the host vehicle may include an image in a right direction of the host vehicle, which is provided to determine whether there is a sidewalk or a pedestrian in the right direction of the host vehicle.

For example the apparatus 1000 for preventing the collision at the intersection according to an embodiment may determine whether there is a sidewalk on the right side of the host vehicle or there is a pedestrian on the sidewalk on the right side of the host vehicle, based on the image at the right side of the host vehicle, which is included in the image around the host vehicle.

For example the apparatus 1000 for preventing the collision at the intersection according to an embodiment may determine whether there is a roadside zone on the right side of the host vehicle or there is a pedestrian in the roadside zone on the right side of the host vehicle, based on the image at the right side of the host vehicle, which is included in the image around the host vehicle.

Herein, the pedestrian may include one of a walker, a stroller, a chair car for walking assistance, or a bicycle.

The image capture device 1012 may include a camera provided in the host vehicle, a camera provided on the road, or the like and may communicate with the communication device 1001, the ultrasonic sensor 1013, or the like.

For example the image capture device 1012 may include one of a camera monitor system (CMS), a surround view monitor (SVM), or a blind-spot view monitor (BVM).

Detailed contents where the apparatus 1000 for preventing the collision at the intersection according to embodiments uses an image around the host vehicle will be described in detail in a description of FIGS. 2 to 5.

The communication device 1001 may receive ultrasonic sensor data from the ultrasonic sensor 1013.

Herein, the ultrasonic sensor data may include data obtained by measuring the periphery of the host vehicle by means of the ultrasonic sensor 1013.

For example, the ultrasonic sensor data may include sensor data provided to calculate a relative speed between a pedestrian in a right direction of the host vehicle and the host vehicle.

The ultrasonic sensor 1013 may include a sensor provided in the host vehicle to collect ultrasonic sensor data about the periphery of the host vehicle using ultrasonic waves and may communicate with the communication device 1001, the image capture device 1012, or the like.

For example the ultrasonic sensor 1013 may include blind spot detection (BSD) or the like.

Detailed contents where the apparatus 1000 for preventing the collision at the intersection according to embodiments uses ultrasonic sensor data will be described in detail in a description of FIGS. 2 to 5.

The communication device 1001 may receive traffic light information from the traffic lights 1014.

Herein, the traffic light information may include one of whether there are traffic lights for a vehicle around the host vehicle or there are traffic lights for a pedestrian around the host vehicle, a type and a duration of a signal which is being turned on by the traffic lights, and a type of a next signal to be turned on when the current signal is ended.

For example, the traffic light information may include information about whether traffic lights at a crosswalk before the host vehicle enters the intersection indicate a walk signal or a walk stop signal.

For another example, the traffic light information may include information about whether traffic lights at a crosswalk in a right direction of the host vehicle after the host vehicle enters the intersection will indicate a walk signal or a walk stop signal.

Furthermore, the traffic lights 1014 may include one of traffic lights for one or more vehicles at an intersection where the host vehicle makes a right turn or traffic lights for one or more crosswalks and may communicate with the communication device 1001, the navigation 1010, or the like.

Detailed contents where the apparatus 1000 for preventing the collision at the intersection according to embodiments uses traffic light information will be described in detail in a description of FIGS. 2 to 5.

The communication device 1001 may receive one of the map information, the location information, the image around the host vehicle, the ultrasonic sensor data, or the traffic light information and may deliver the received information to one of the right turn prediction device 1002, the right turn performance determination device 1003, the controller 1004, or a braking device 1015.

The apparatus 1000 for preventing the collision at the intersection according to an embodiment may include the right turn prediction device 1002.

The right turn prediction device 1002 may receive one of the map information, the location information, or the image around the host vehicle from the communication device 1001.

The right turn prediction device 1002 may predict whether the host vehicle will make a right turn at the intersection, based on one of the map information, the location information, or the image around the host vehicle.

In detail, the right turn prediction device 1002 may determine whether the host vehicle will enter the intersection, based on one of the map information or the location information.

The right turn prediction device 1002 may determine whether the host vehicle travels in a right turn lane which is near a right edge of the road, based on the image around the host vehicle, when it is determined that the host vehicle will enter the intersection.

The right turn prediction device 1002 may predict that the host vehicle will make a right turn at the intersection, when it is determined that the host vehicle travels in the right turn lane.

Herein, the intersection may include a cross-shaped (+) road, a T-shaped road, or a portion where two or more roads intersect each other.

Furthermore, the intersection may have one or more traffic lights 1014 for a vehicle which travels in the intersection and one or more traffic lights 1014 for a pedestrian who wants to cross the intersection.

The right turn lane may include a lane in which the vehicle travels before entering the intersection to make a right turn.

For example, when there are several lanes on the road where the vehicle travels, the rightmost lane of the road may be an example of the right turn lane.

Detailed contents where the apparatus 1000 for preventing the collision at the intersection according to embodiments or the right turn prediction device 1002 predicts whether the host vehicle will makes a right turn will be described in detail in a description of FIGS. 2 to 5.

The apparatus 1000 for preventing the collision at the intersection according to an embodiment may include the right turn performance determination device 1003.

When it is predicted that the host vehicle will make the right turn at the intersection, the right turn performance determination device 1003 may determine whether the host vehicle is able to make a right turn safely, based on one of the image around the host vehicle, the ultrasonic sensor data, or the traffic light information.

In detail, when it is predicted that the host vehicle will make the right turn at the intersection, the right turn performance determination device 1003 may determine whether there is a pedestrian on a sidewalk on the right side of the host vehicle or on a roadside zone on the right side of the host vehicle, based on the image around the host vehicle, when it is identified that pedestrian traffic lights corresponding to a crosswalk located at the intersection will not turn on a walk signal during a predetermined period immediately before the vehicle will enter the intersection until immediately after the vehicle will exit the intersection, based on the traffic light information.

The right turn performance determination device 1003 may calculate a relative speed between the host vehicle and the pedestrian, based on the ultrasonic sensor data, when it is determined that there is the pedestrian on the sidewalk on the right side of the host vehicle or on the roadside zone on the right side of the host vehicle, and may determine whether the host vehicle will collide with the pedestrian, based on the calculated relative speed.

The right turn performance determination device 1003 may determine that the host vehicle is unable to make a right turn safely, when it is determined that the host vehicle would collide with the pedestrian.

Herein, the sidewalk on the right side of the host vehicle may include a sidewalk which is present on the right side of the host vehicle.

The right turn prediction device 1002 may determine whether the host vehicle travels in a right turn lane, when it is determined that there is the sidewalk on the right side of the host vehicle. The right turn performance determination device 1003 may calculate a relative speed between the host vehicle and the pedestrian, when it is determined that there is the pedestrian on the sidewalk on the right side of the host vehicle and may determine whether the host vehicle will collide with the pedestrian.

The roadside zone on the right side of the host vehicle may include an edge portion of a road, which displays a boundary using a safety sign or the like to ensure safety of a pedestrian on the road where a sidewalk and a roadway are not divided.

The pedestrian should pass through the roadside zone on the road where the sidewalk and the roadway are not divided.

For example, the roadside zone on the right side of the host vehicle may include a portion displayed as a bicycle lane on the edge of the road. In this case, the safety sign may include a bicycle road marking displayed on the road surface.

The right turn prediction device 1002 may determine whether the host vehicle travels in a right turn lane, when it is determined that there is the roadside zone on the right side of the host vehicle. The right turn performance determination device 1003 may calculate a relative speed between the host vehicle and the pedestrian, when it is determined that there is the pedestrian on the roadside zone on the right side of the host vehicle and may determine whether the host vehicle will collide with the pedestrian.

The apparatus 1000 for preventing the collision at the intersection according to an embodiment may include the controller 1004.

The controller 1004 may control the host vehicle depending on the result of determining whether the host vehicle is able to make the right turn safely.

In detail, the controller 1004 may control the host vehicle to be stopped before the host vehicle enters a crosswalk located at the intersection before or after the host vehicle enters the intersection, when it is determined that the host vehicle is unable to make the right turn safely.

For example, when it is determined that the host vehicle is not able to make the right turn safely any longer while making the right turn after entering the intersection, the controller 1004 may control the braking device 1015 to control the host vehicle to be stopped before the host vehicle enters the crosswalk located at the intersection after the host vehicle enters the intersection.

Herein, the braking device 1015 may include a brake system or the like provided in the host vehicle and may brake and stop the host vehicle.

Detailed contents where the controller 1004 controls the host vehicle will be described in detail in a description of FIGS. 2 to 5.

First of all, referring to FIGS. 2, 3A, 3B, and 5, a description will be given in detail of the communication device (e.g., 1001 of FIG. 1) and the right turn prediction device (e.g., 1002 of FIG. 1), in the apparatus for preventing the collision at the intersection and the method thereof according to an embodiment.

Figure 2:
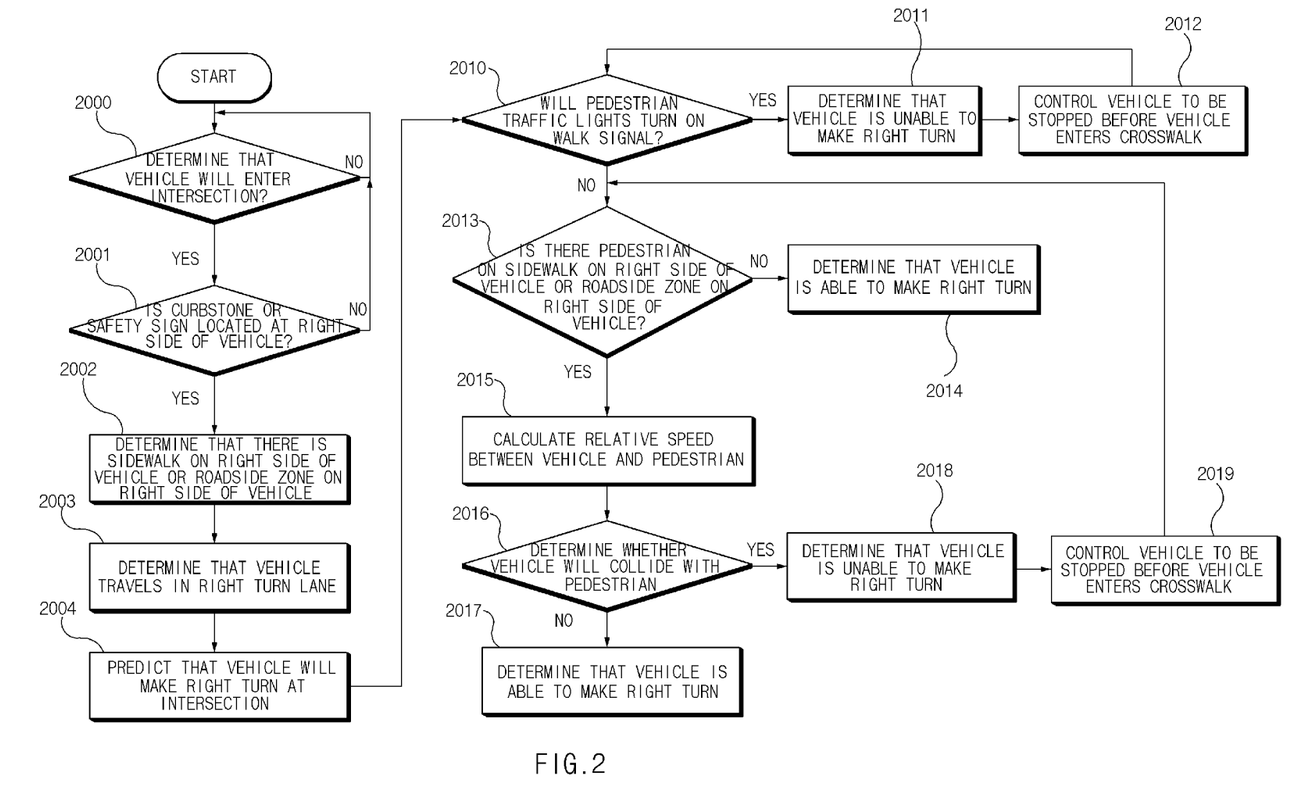
FIG. 2 is a drawing illustrating an example of determining whether a vehicle will collide with a pedestrian depending on an apparatus for preventing a collision at an intersection and a method thereof according to an embodiment of the present disclosure.

FIG. 2 is a drawing illustrating an example of determining whether a host vehicle will collide with a pedestrian depending on an apparatus (e.g., 1000 of FIG. 1) for preventing a collision at an intersection and a method thereof according to an embodiment of the present disclosure.

Figure 3A:
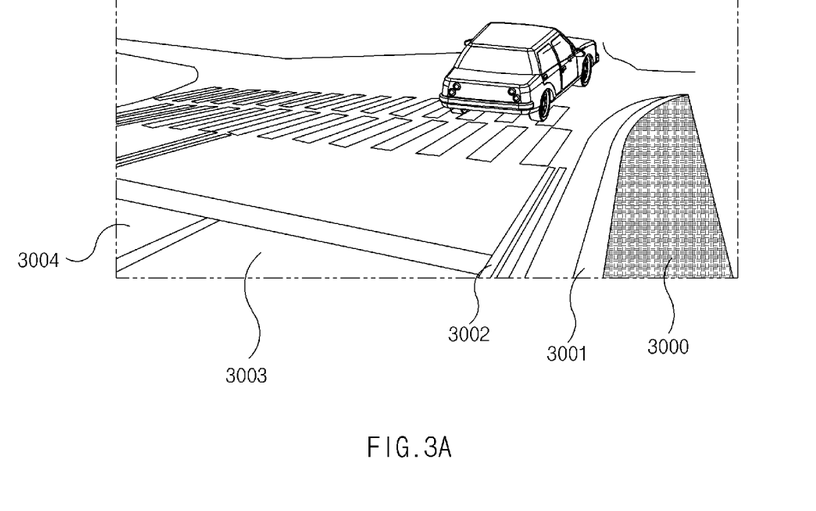
FIGS. 3A and 3B are drawings illustrating an example of a right turn lane, a sidewalk on the right side of the vehicle, or a roadside zone on the right side of the vehicle, in an apparatus for preventing a collision at an intersection and a method thereof according to embodiments of the present disclosure.
Figure 3B:
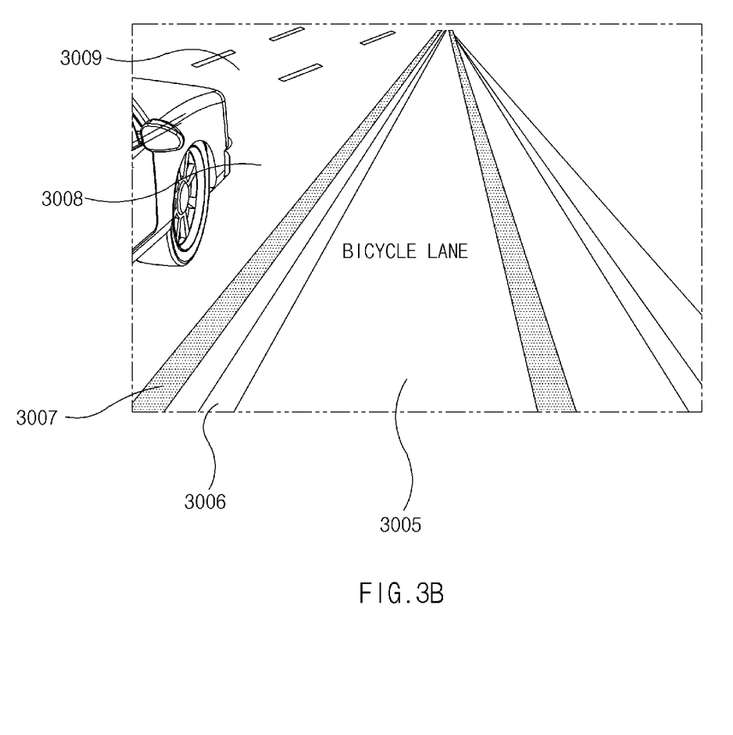

FIGS. 3A and 3B are drawings illustrating an example of a right turn lane 3003 or 3008, a sidewalk 3000 on the right side of the vehicle, or a roadside zone 3005 on the right side of the vehicle, in an apparatus for preventing a collision at an intersection and a method thereof according to embodiments of the present disclosure.

Figure 5:
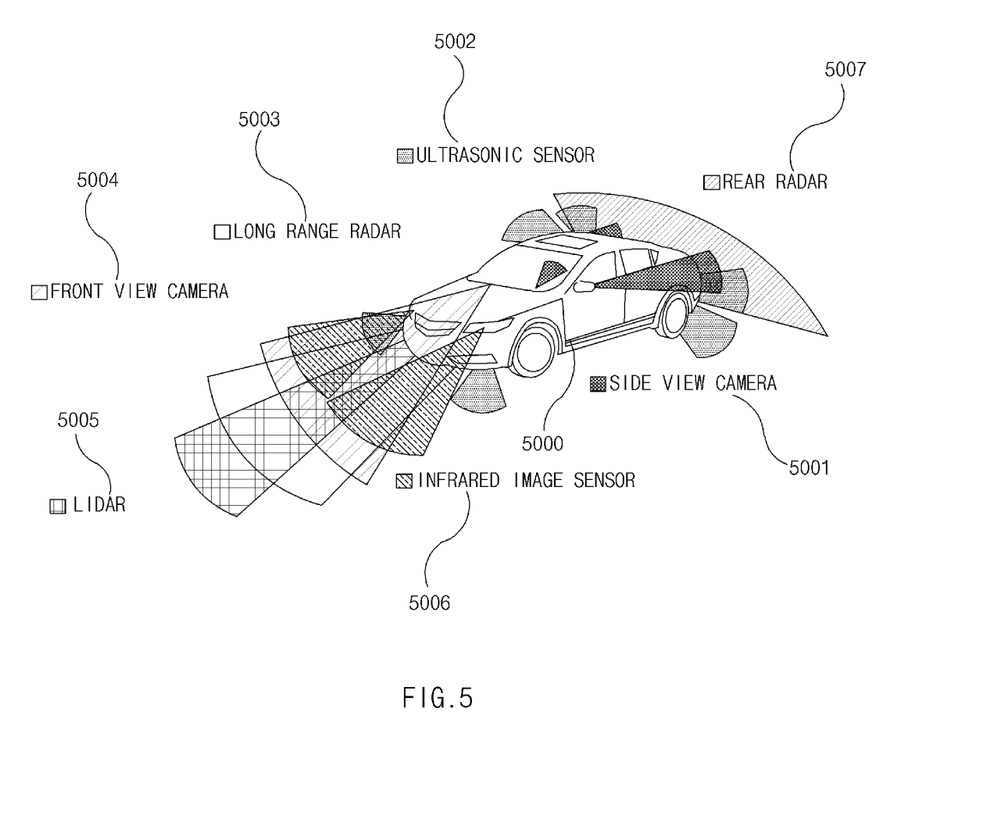
FIG. 5 is a drawing illustrating an example of a vehicle and cameras and sensors provided in the vehicle, in an apparatus for preventing a collision at an intersection and a method thereof according to embodiments of the present disclosure.

FIG. 5 is a drawing illustrating an example of a vehicle and cameras (1012 of FIG. 1) and sensors (e.g., 1013 of FIG. 1) provided in the vehicle, in an apparatus for preventing a collision at an intersection and a method thereof according to embodiments of the present disclosure. A communication device may receive one of map information, location information, an image around a host vehicle (hereinafter, referred to as a "surrounding image"), ultrasonic sensor data, or traffic light information and may deliver the received information to one of a right turn prediction device (e.g., 1002 of FIG. 1), a right turn performance determination device (e.g., 1003 of FIG. 1), or a controller (e.g., 1004 of FIG. 1).

In operation 2000, the right turn prediction device may determine whether the host vehicle will enter an intersection, based on one of the map information or the location information.

For example, the right turn prediction device may determine a current location of the host vehicle and a driving direction of the host vehicle, based on the location information, and may determine that an intersection is located in front of the host vehicle, based on the map information. In such a case, the right turn prediction device may determine that the host vehicle will enter the intersection (YES of operation 2000).

In operations 2001, 2002, and 2003, the right turn prediction device may determine whether the host vehicle travels in a right turn lane 3003 or 3008 which is along a right edge of the road, based on the surrounding image, when it is determined that the host vehicle will enter the intersection (YES of operation 2000).

In detail, in operation 2002, the right turn prediction device may determine that there is a sidewalk 3000 on the right side of the host vehicle, when it is identified that a curbstone is located at the right side of the host vehicle (YES of operation 2001), based on the surrounding image.

Herein, the curbstone may include stones installed to display a boundary dividing a sidewalk and a roadway and may ensure the safety of a pedestrian.

For example, a curbstone 3001 of FIG. 3A may be an example of a curbstone installed to clear a boundary which divides lanes 3003 and 3004 and a sidewalk 3000 on the right side of the host vehicle and ensure the safety of a pedestrian.

For example, in operation 2002, the right turn prediction device may determine that there is the sidewalk 3000 on the right side of the host vehicle, when it is identified that the curbstone 3001 is located at the right side of the host vehicle which travels in the right turn lane 3003 or 3008 (YES of operation 2001), based on the surrounding image.

For another example, in operation 2002, the right turn prediction device may determine that there is the sidewalk 3000 on the right side of the host vehicle, when it is identified that solid road markings 3002 are located on the right side of the host vehicle which travels in the right turn lane 3003 or 3008 (YES of operation 2001), based on the surrounding image.

In operation 2002, the right turn prediction device may determine that there is a roadside zone 3005 on the right side of the host vehicle, when it is identified that a safety sign about the safety of the pedestrian is located at the right side of the host vehicle (YES of operation 2001).

Herein, the safety sign may include one of a solid yellow line, a solid white line, or a bicycle road marking.

For example, a solid yellow line 3007, a solid white line 3006, or road markings of a bicycle lane of FIG. 3B may be an example of a safety sign displayed to clear a boundary which divides lanes 3008 and 3009 and the bicycle lane included in the roadside zone 3005 on the right side of the host vehicle and ensure the safety of a pedestrian.

For example, in operation 2002, the right turn prediction device may determine that there is the roadside zone 3005 on the right side of the host vehicle, when it is identified that the solid yellow line 3007, the solid white line 3006, or the safety sign including road markings of the bicycle lane is located on the right side of the host vehicle which travels the right turn lane 3003 or 3008 (YES of operation 2001), based on the surrounding image.

For example, in operation 2001, the right turn prediction device may determine that there is the curbstone 3001 at the right side of the host vehicle or there are solid road markings at the right side of the host vehicle, based on an image captured using one of a side view camera 5001, an ultrasonic sensor 5002, a long range radar 5003, a front view camera 5004, a light detection and ranging (LiDAR) 5005, an infrared image sensor 5006, or a rear radar 5007 provided in a host vehicle 5000. The side view camera 5001 may assist with blind spot detection and lane departure prevention, the ultrasonic sensor 5002 may assist with parking and blind spot detection, and the long range radar 5003 may assist with adaptive driving control and automatic emergency braking. In addition, the front view camera 5004 may assist with traffic light detection and forward pedestrian detection, the LiDAR 5005 may assist with forward obstacle detection, the infrared image sensor 5006 may assist with night driving (e.g., night vision), and the rear radar 5007 may assist with rear collision warning.

For example, in operation 2001, the right turn prediction device may determine that there are a solid yellow line 3007, a solid white line 3006, and road markings of a bicycle lane on the right side of the host vehicle, based on the image captured using one of the side view camera 5001, the ultrasonic sensor 5002, the long range radar 5003, the front view camera 5004, the LiDAR 5005, the infrared image sensor 5006, or the rear radar 5007 provided in the host vehicle 5000.

In operation 2003, the right turn prediction device may determine that the host vehicle travels in the right turn lane 3003 or 3008, when it is determined that there is one of the sidewalk 3000 on the right side of the host vehicle or the roadside zone 3005 on the right side of the host vehicle in operation 2002, based on the surrounding image.

For example, the right turn lane 3003 or 3008 may include the rightmost lane among several lanes, and the sidewalk 3000 on the right side of the host vehicle or the roadside zone on the right side of the host vehicle may be located closest to the right turn lane 3003 or 3008 among several lanes.

When it is determined that there is the sidewalk 3000 on the right side of the host vehicle or there is the roadside zone 3005 on the right side of the host vehicle, based on the surrounding image in operation 2002, in operation 2003, the right turn prediction device may determine that the host vehicle travels in the right turn lane 3003 or 3008.

On the other hand, when the host vehicle is traveling in a lane other than the right turn lane 3003, 3008, as a distance between the sidewalk 3000 on the right side of the host vehicle or the roadside zone 3005 on the right side of the host vehicle, which is determined based on the surrounding image, and the host vehicle has a larger value than when the host vehicle travels in the right turn lane 3003 or 3008 or as visibility is restricted by another vehicle which is traveling in a lane on the right side of the host vehicle or the like, the sidewalk 3000 on the right side of the host vehicle or the roadside zone 3005 on the right side of the host vehicle may not be detected by means of the surrounding image.

In other words, in operation 2003, the right turn prediction device may determine that the host vehicle travels in the right turn lane 3003 or 3008, when it is determined that there is one of the sidewalk 3000 on the right side of the host vehicle or the roadside zone 3005 on the right side of the host vehicle in operation 2002, based on the surrounding image.

In operation 2004, the right turn prediction device may predict that the host vehicle will make a right turn at the intersection, when it is determined that the host vehicle travels in the right turn lane 3003 or 3008 in operation 2003.

For example, when it is determined that the host vehicle will enter the intersection (YES of operation 2000) and when it is determined that the host vehicle travels in the right turn lane 3003 or 3008 in operation 2003, in operation 2004, the right turn prediction device may predict that the host vehicle will make a right turn at the intersection.

As such, the apparatus for preventing the collision at the intersection and the method thereof according to embodiments may determine whether the host vehicle will enter the intersection, using the image around the host vehicle, may determine whether there is the sidewalk 3000 on the right side of the host vehicle or the roadside zone 3005 on the right side of the host vehicle, and may determine whether the host vehicle will make a right turn, thus improving the accuracy of determining a possibility of colliding with a pedestrian, which will occur in a process where the host vehicle makes the right turn.

Hereinafter, a description will be given in detail of the right turn performance determination device and the controller, based on the result predicted by the right turn prediction device, with reference to FIGS. 4 and 5.

Figure 4:
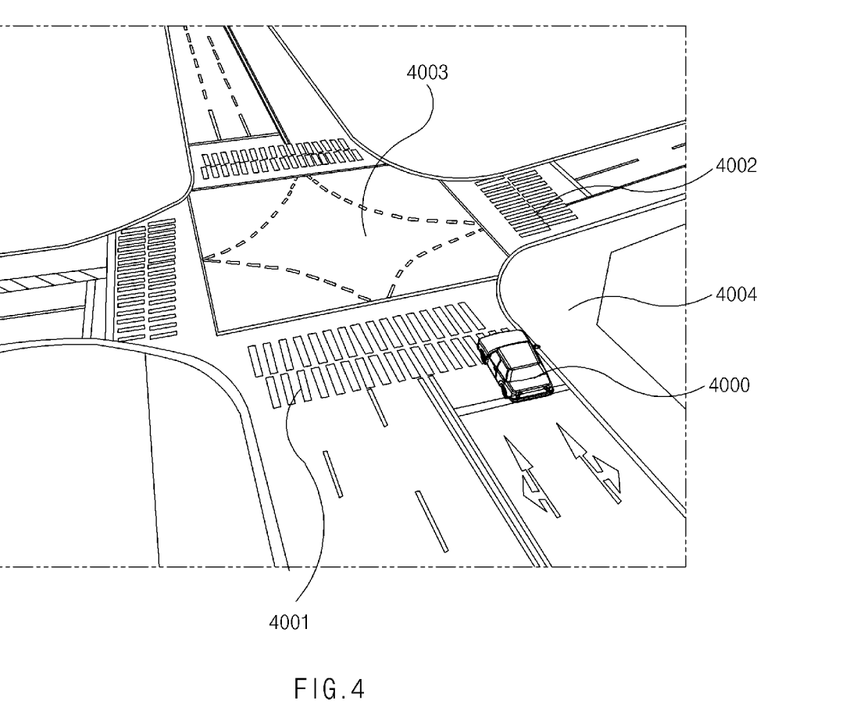
FIG. 4 is a drawing illustrating an example of an intersection and a crosswalk, in an apparatus for preventing a collision at an intersection and a method thereof according to embodiments of the present disclosure.

FIG. 4 is a drawing illustrating an example of an intersection 4003 and a crosswalk 4001 or 4002, in an apparatus for preventing a collision at an intersection and a method thereof according to embodiments of the present disclosure.

FIG. 5 is a drawing illustrating an example of a vehicle and cameras (e.g., 1012 of FIG. 1) and sensors (e.g., 1013 of FIG. 1) provided in the vehicle, in an apparatus for preventing a collision at an intersection and a method thereof according to embodiments of the present disclosure.

When it is predicted that a host vehicle will make a right turn at an intersection in operation 2004, in operation 2011, a right turn performance determination device may determine that the host vehicle is unable to make the right turn safely, when it is identified that pedestrian traffic lights corresponding to a crosswalk located at the intersection will turn on a walk signal during a predetermined period immediately before the vehicle will enter the intersection until immediately after the vehicle will exit the intersection (YES of operation 2010), based on traffic light information.

For example, the right turn performance determination device may determine whether pedestrian traffic lights corresponding to a crosswalk 4001 or 4002 located at an intersection 4003 will turn on a walk signal during a predetermined period immediately before the host vehicle 4000 will enter the intersection 4003 until immediately after the host vehicle 4000 will exit the intersection 4003, using one of a side view camera 5001, an ultrasonic sensor 5002, a long range radar 5003, a front view camera 5004, a LiDAR 5005, an infrared image sensor 5006, or a rear radar 5007 provided in the host vehicle 4000.

For another example, when the pedestrian traffic lights corresponding to the crosswalk 4001 located at the intersection 4003 will turn on the walk signal during a predetermined period immediately before the host vehicle 4000 will enter the intersection 4003 until immediately after the host vehicle 4000 will exit the intersection 4003 (YES of operation 2010), in operation 2011, the right turn performance determination device may determine that the host vehicle 4000 is unable to make the right turn safely.

Meanwhile, although the pedestrian traffic lights corresponding to the crosswalk 4001 located at the intersection 4003 will turn on the walk signal during a predetermined period immediately before the host vehicle 4000 will enter the intersection 4003 until immediately after the host vehicle 4000 will exit the intersection 4003 (YES of operation 2010), it is obvious that the right turn performance determination device may determine it differently from that in the drawing, in a country which allows the host vehicle 4000 to make a right turn.

In operation 2012, a controller may control the host vehicle to be stopped before the host vehicle enters a crosswalk 4001 or 4002, when it is identified that pedestrian traffic lights corresponding to the crosswalk 4001 or 4002 located at an intersection 4003 will turn on a walk signal during a predetermined period immediately before the host vehicle 4000 will enter the intersection 4003 until immediately after the host vehicle 4000 will exit the intersection 4003 (YES of operation 2010) or when it is determined that the host vehicle 4000 is unable to make the right turn safely in operation 2011.

For example, in operation 2012, the controller may control the host vehicle 4000 to be stopped before the host vehicle 4000 enters the crosswalk 4001 located at the intersection 4003 before the host vehicle 4000 enters the intersection 4003 by controlling a braking device (e.g., 1015 of FIG. 1) provided in the host vehicle 4000 to brake.

In operation 2010, the right turn performance determination device may determine whether the pedestrian traffic lights corresponding to the crosswalk 4001 or 4002 located at the intersection 4003 will turn on the walk signal again during a predetermined period immediately before the host vehicle 4000 will enter the intersection 4003 until immediately after the host vehicle 4000 will exit the intersection 4003, based on the traffic light information.

For example, in the state where the controller controls the host vehicle 4000 to be stopped before the host vehicle 4000 enters the crosswalk 4001 or 4002 in operation 2012, in operation 2010, the right turn performance determination device may determine whether the turn-on of the walk signal of the pedestrian traffic lights corresponding to the crosswalk 4001 or 4002 is ended.

When it is predicted that the host vehicle 4000 will make the right turn at the intersection 4003 in operation 2004, in operation 2013, the right turn performance determination device may determine whether there is a pedestrian on a sidewalk 4004 on the right side of the host vehicle 4000 or on a roadside zone on the right side of the host vehicle 4000, based on the surrounding image, when it is identified that the pedestrian traffic lights corresponding to the crosswalk 4001 or 4002 located at the intersection 4003 will not turn on the walk signal during a predetermined period immediately before the host vehicle 4000 will enter the intersection 4003 until immediately after the host vehicle 4000 will exit the intersection 4003, based on the traffic light information.

For example, in operation 2013, the right turn performance determination device may determine that there is a pedestrian on the sidewalk 4004 on the right side of the host vehicle 4000, using one of a side view camera 5001, an ultrasonic sensor 5002, a long range radar 5003, a front view camera 5004, a LiDAR 5005, an infrared image sensor 5006, or a rear radar 5007 provided in a host vehicle 4000.

For another example, when the pedestrian traffic lights corresponding to the crosswalk 4001 located at the intersection 4003 will not turn on the walk signal during a predetermined period immediately before the host vehicle 4000 will enter the intersection 4003 until immediately after the host vehicle 4000 will exit the intersection 4003 (NO of operation 2010), because requirements for the turn-on state of the pedestrian traffic lights to allow the host vehicle 4000 to make a right turn are met once and because it is expected that the host vehicle 4000 will enter the intersection 4003 for a driver of the host vehicle 4000 to make a right turn, in operation 2013, the right turn performance determination device may determine whether there is a pedestrian on the sidewalk 4004 on the right side of the host vehicle 4000.

In operation 2014, the right turn performance determination device may determine that the host vehicle 4000 is able to make a right turn safely, when it is determined that there is no pedestrian on the sidewalk 4004 on the right side of the host vehicle 4000 or a roadside zone on the right side of the host vehicle 4000.

In operation 2015, the right turn performance determination device may calculate a relative speed between the host vehicle 4000 and the pedestrian, based on the ultrasonic sensor data, when it is determined that there is the pedestrian on the sidewalk 4004 on the right side of the host vehicle 4000 or on the roadside zone on the right side of the host vehicle 4000. In operation 2016, the right turn performance determination device may determine whether the host vehicle 4000 will collide with the pedestrian, based on the calculated relative speed.

For example, in operation 2015, the right turn performance determination device may calculate a relative speed between the host vehicle 4000 and the pedestrian present on the sidewalk 4004 on the right side of the host vehicle 4000, based on one of the side view camera 5001, the ultrasonic sensor 5002, the long range radar 5003, the front view camera 5004, the LiDAR 5005, the infrared image sensor 5006, or the rear radar 5007 provided in the host vehicle 4000.

When it is determined that the host vehicle will not collide with the pedestrian (NO of operation 2016), in operation 2017, the right turn performance determination device may determine that the host vehicle is able to make a right turn safely.

In operation 2018, the right turn performance determination device may determine that the host vehicle 4000 is unable to make a right turn safely, when it is determined that the host vehicle will collide with the pedestrian (YES of operation 2016).

For example, when it is determined that the host vehicle 4000 will collide with the pedestrian present on the sidewalk 4004 on the right side of the host vehicle 4000, who is trying to quickly cross the crosswalk 4002, while the host vehicle 4000 passes through the crosswalk 4002 located at the intersection 4003 after entering the intersection 4003, based on the relative speed between the host vehicle 4000 and the pedestrian present on the sidewalk 4004 on the right side of the host vehicle 4000 (YES of operation 2016), in operation 2018, the right turn performance determination device may determine that the host vehicle 4000 is unable to make a right turn safely.

As such, the apparatus for preventing the collision at the intersection and the method thereof according to embodiments of the present disclosure may calculate the relative speed between the host vehicle and the pedestrian and may determine the possibility of collision between the host vehicle and the pedestrian, thus facilitating the sophisticated determination of the possibility of collision.

In operation 2019, the controller may control the host vehicle to be stopped before the host vehicle enters the crosswalk 4001 or 4002, when it is determined that the host vehicle will collide with the pedestrian (YES of operation 2016) or when it is determined that the host vehicle is unable to make the right turn safely in operation 2018.

For example, in operation 2019, the controller may control the host vehicle 4000 to be stopped before the host vehicle 4000 enters the crosswalk 4002 located at the intersection 4003 after entering the intersection 4003 by controlling a braking device provided in the host vehicle 4000 to brake.

In operation 2013, the right turn performance determination device may determine whether there is a pedestrian on the sidewalk 4004 on the right side of the host vehicle 4000 or the roadside zone on the right side of the host vehicle 4000 again.

For example, in the state where the controller controls the host vehicle to be stopped before the host vehicle enters the crosswalk 4001 or 4002 in operation 2019, because it is determined that the host vehicle will collide with the pedestrian on the sidewalk 4004 on the right side of the host vehicle (YES of operation 2016), when there is no pedestrian on the sidewalk 4004 on the right side of the host vehicle or the roadside zone on the right side of the host vehicle (NO of operation 2013) or when it is determined that the host vehicle will not collide with the pedestrian (NO of operation 2016) although there is the pedestrian on the sidewalk 4004 on the right side of the host vehicle or the roadside zone on the right side of the host vehicle (YES of operation 2013), in operation 2014 or 2017, the right turn performance determination device may determine that the host vehicle is able to make a right turn safely.

As such, the apparatus for preventing the collision at the intersection and the method thereof according to embodiments of the present disclosure may determine the possibility of collision between the host vehicle and the pedestrian on the sidewalk on the right side of the host vehicle or on the roadside zone on the right side of the host vehicle, using the camera, the ultrasonic sensor, or the like previously provided in the host vehicle, thus preventing the collision at the intersection 4003 without increasing unnecessary costs according to hardware addition and without increasing a weight of the host vehicle.

Figure 6:
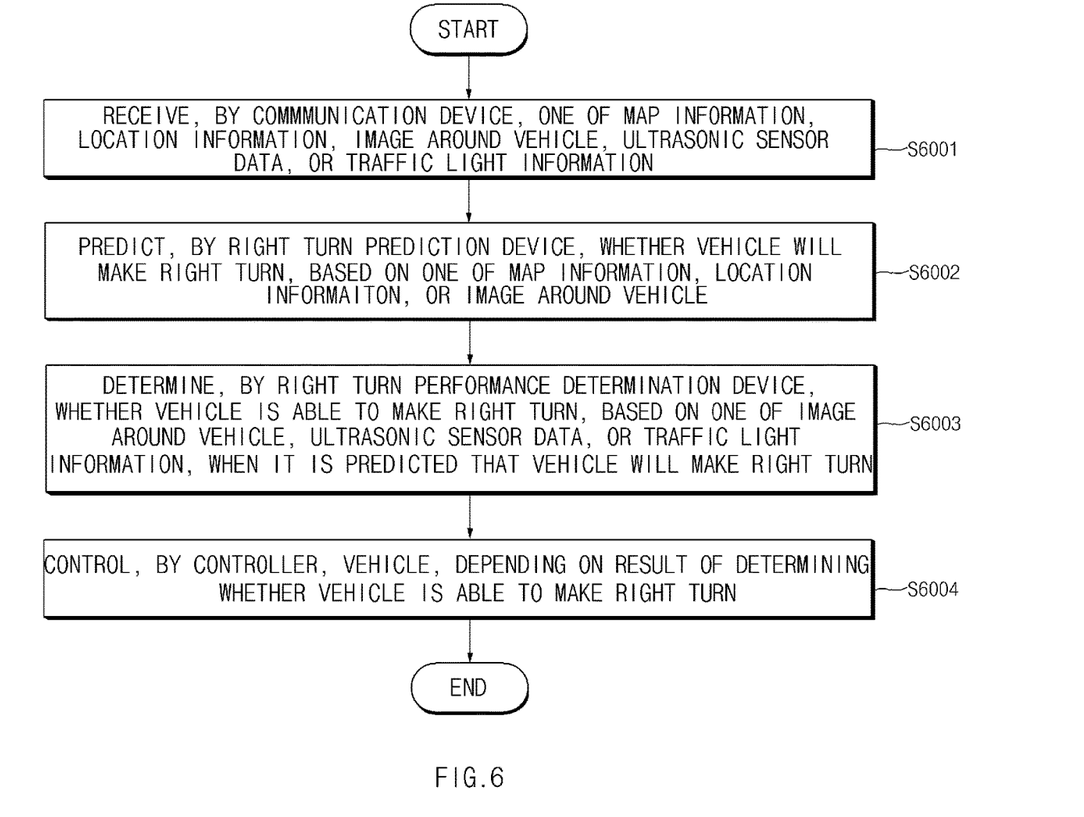
FIG. 6 is a drawing illustrating a method for preventing a collision at an intersection according to an embodiment of the present disclosure.

FIG. 6 is a drawing illustrating a method for preventing a collision at an intersection according to an embodiment of the present disclosure.

The apparatus (e.g., 1000 of FIG. 1) for preventing the collision at the intersection according to embodiments of the present disclosure, which is described above with reference to FIGS. 1 to 5, may perform the method described in the drawing.

The method for preventing the collision at the intersection according to embodiments may include receiving (S6001), by a communication device, one of map information, location information, an image around a host vehicle, ultrasonic sensor data, or traffic light information, predicting (S6002), by a right turn prediction device, whether the host vehicle will make a right turn, based on one of the map information, the location information, or the image around the host vehicle, determining (S6003), by a right turn performance determination device, whether the host vehicle is able to make a right turn safely, based on one of the image around the host vehicle, the ultrasonic sensor data, or traffic light information, when it is predicted that the host vehicle will make the right turn, and controlling (S6004), by a controller, the host vehicle depending on the result of determining whether the host vehicle is able to make the right turn safely.

S6001 may be performed by the communication device (e.g., 1001 of FIG. 1) described above with reference to FIGS. 1 to 5.

S6002 may be performed by the right turn prediction device (e.g., 1002 of FIG. 1) described above with reference to FIGS. 1 to 5.

S6002 may include one of the following operations i) to iii).

First of all, S6002 may include i) determining, by the right turn prediction device, whether the host vehicle will enter the intersection, based on one of the map information or the location information.

Furthermore, S6002 may include ii) determining, by the right turn prediction device, whether the host vehicle travels in a right turn lane which is along a right edge of a road, based on the image around the host vehicle, when it is determined that the host vehicle will enter the intersection.

Furthermore, S6002 may include iii) predicting, by the right turn prediction device, that the host vehicle will make a right turn at the intersection, when it is determined that the host vehicle travels in the right turn lane.

In addition, the determining of whether the host vehicle travels in the right turn lane may include one of a) determining, by the right turn prediction device, that the host vehicle travels in the right turn lane, when it is determined that there is one of a sidewalk on the right side of the host vehicle or a roadside zone on the right side of the host vehicle, based on the image around the host vehicle, b) determining, by the right turn prediction device, that there is the sidewalk on the right side of the host vehicle, when it is identified that a curbstone is located at the right side of the host vehicle, based on the image around the host vehicle, or c) determining, by the right turn prediction device, that there is the roadside zone on the right side of the host vehicle, when it is identified that a safety sign about the safety of a pedestrian is located at the right side of the host vehicle.

Herein, the above-mentioned safety sign may include one of a solid yellow line, a solid white line, or a bicycle road marking.

S6003 may be performed by the right turn performance determination device (e.g., 1003 of FIG. 1) described above with reference to FIGS. 1 to 5.

S6003 may include one of the following operations ① to ④.

First of all, S6003 may include ① determining, by the right turn performance determination device, that the host vehicle is unable to make the right turn safely, when it is identified that pedestrian traffic lights corresponding to a crosswalk located at the intersection will turn on a walk signal during a predetermined period immediately before the host vehicle will enter the intersection until immediately after the host vehicle will exit the intersection, based on traffic light information, when it is predicted that the host vehicle will make the right turn at the intersection.

Furthermore, S6003 may include ② determining, by the right turn performance determination device, whether there is a pedestrian on a sidewalk on the right side of the host vehicle or on a roadside zone on the right side of the host vehicle, based on the image around the host vehicle, when it is identified that the pedestrian traffic lights corresponding to the crosswalk located at the intersection will not turn on the walk signal during the predetermined period immediately before the host vehicle will enter the intersection until immediately after the host vehicle will exit the intersection, based on the traffic light information, when it is predicted that the host vehicle will make the right turn at the intersection.

Furthermore, S6003 may further include ③ calculating, by the right turn performance determination device, a relative speed between the host vehicle and the pedestrian, based on the ultrasonic sensor data, when it is determined that there is the pedestrian on the sidewalk on the right side of the host vehicle or on the roadside zone on the right side of the host vehicle, and determining, by the right turn performance determination device, whether the host vehicle will collide with the pedestrian, based on the calculated relative speed.

Furthermore, S6003 may further include ④ determining, by the right turn performance determination device, that the host vehicle is unable to make the right turn safely, when it is determined that the host vehicle will collide with the pedestrian.

S6004 may be performed by the controller (e.g., 1004 of FIG. 1) described above with reference to FIGS. 1 to 5.

S6004 may include controlling, by the controller, the host vehicle to be stopped before the host vehicle enters the crosswalk.

In detail, S6004 may include controlling, by the controller, the host vehicle to be stopped before the host vehicle enters the crosswalk located at the intersection before or after the host vehicle enters the intersection.

A description will be given of possible effects of the apparatus for preventing the collision at the intersection and the method thereof according to embodiments of the present disclosure.

The apparatus for preventing the collision at the intersection and the method thereof may be provided to determine whether the vehicle is able to make a right turn at the intersection safely and control the vehicle to be stopped to prevent a collision between a pedestrian and the vehicle, when it is determined that the vehicle is unable to make the right turn safely, thus improving safety of the pedestrian and a driver.

The apparatus for preventing the collision at the intersection and the method thereof may be provided to determine whether the vehicle will enter the intersection, using an image around the vehicle, which is obtained using an existing camera or the like provided in the vehicle, determine whether there is a sidewalk on the right side of the vehicle or a roadside zone on the right side of the vehicle, determine whether the vehicle will make a right turn, and determine the presence of a pedestrian on the sidewalk on the right side of the vehicle or the like, thus preventing the collision at the intersection without increasing unnecessary costs and without increasing a weight of the vehicle.

The apparatus for preventing the collision at the intersection and the method thereof may be provided to calculate a relative speed between a vehicle and a pedestrian, using an existing ultrasonic sensor provided in the vehicle, and determine a possibility of collision between the vehicle and the pedestrian to facilitate sophisticated determination of the possibility of collision.

In addition, various effects ascertained directly or indirectly through embodiments of the present disclosure may be provided.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, embodiments of the present invention are not intended to limit the technical spirit of the present invention, but are provided only for illustrative purposes. The scope of the present disclosure should be construed on the basis of the accompanying claims, and all the technical ideas within the scope equivalent to the claims should be included in the scope of the present disclosure.

What is claimed is:

1. An apparatus for preventing a collision at an intersection, the apparatus comprising:
    a communication device configured to receive at least one of map information, location information, an image around a vehicle, ultrasonic sensor data, or traffic light information;
    a right turn prediction device configured to predict whether the vehicle will make a right turn at the intersection, based on at least one of the map information, the location information, or the image around the vehicle;
    a right turn performance determination device configured to:
        determine whether the vehicle is able to make the right turn safely, based on at least one of the image around the vehicle, the ultrasonic sensor data, or the traffic light information and based on a prediction that the vehicle will make the right turn at the intersection; and
        in response to the prediction that the vehicle will make the right turn at the intersection, determine that the vehicle is unable to make the right turn safely in response to an identification of a pedestrian traffic light corresponding to a crosswalk located at the intersection being scheduled to turn on a walk signal during a predetermined period immediately before the vehicle will enter the intersection until immediately after the vehicle will exit the intersection based on the traffic light information; and
    a controller configured to control the vehicle according to the determination of whether the vehicle is able to make the right turn safely.

2. The apparatus of claim 1, wherein the right turn prediction device is configured to:
    determine whether the vehicle will enter the intersection based on at least one of the map information or the location information;
    determine whether the vehicle travels in a right turn lane based on the image around the vehicle in response to a determination that the vehicle will enter the intersection; and
    predict that the vehicle will make the right turn at the intersection in response to a determination that the vehicle travels in the right turn lane.

3. The apparatus of claim 2, wherein the right turn prediction device is configured to determine that the vehicle travels in the right turn lane in response to a determination of a sidewalk on a right side of the vehicle or a roadside zone on the right side of the vehicle based on the image around the vehicle.

4. The apparatus of claim 3, wherein the right turn prediction device is configured to determine that there is the sidewalk on the right side of the vehicle in response to an identification of a curbstone at the right side of the vehicle based on the image around the vehicle.

5. The apparatus of claim 3, wherein the right turn prediction device is configured to determine that there is the roadside zone on the right side of the vehicle in response to an identification of a safety sign concerning safety of a pedestrian at the right side of the vehicle.

6. The apparatus of claim 5, wherein the safety sign comprises at least one of a solid yellow line, a solid white line, or a bicycle road marking.

7. The apparatus of claim 1, wherein
    the controller is configured to control the vehicle to be stopped before the vehicle enters the crosswalk.

8. The apparatus of claim 1, wherein, in response to the prediction that the vehicle will make the right turn at the intersection, the right turn performance determination device is configured to determine whether there is a pedestrian on a sidewalk on a right side of the vehicle or on a roadside zone on the right side of the vehicle, based on the image around the vehicle, in response to a determination that the pedestrian traffic light is not scheduled to turn on the walk signal during the predetermined period immediately before the vehicle will enter the intersection until immediately after the vehicle will exit the intersection, based on the traffic light information.

9. The apparatus of claim 8, wherein, in response to a determination that there is the pedestrian on the sidewalk on the right side of the vehicle or the roadside zone on the right side of the vehicle, the right turn performance determination device is configured to:
    calculate a relative speed between the vehicle and the pedestrian based on the ultrasonic sensor data; and
    determine whether the vehicle will collide with the pedestrian based on the relative speed.

10. The apparatus of claim 9, wherein:
    the right turn performance determination device is configured to determine that the vehicle is unable to make the right turn safely in response to a determination that the vehicle will collide with the pedestrian; and
    the controller is configured to control the vehicle to be stopped before the vehicle enters the crosswalk.

11. A method for preventing a collision at an intersection, the method comprising:
    receiving at least one of map information, location information, an image around a vehicle, ultrasonic sensor data, or traffic light information;

predicting whether the vehicle will make a right turn at the intersection based on at least one of the map information, the location information, or the image around the vehicle;

determining whether the vehicle is able to make the right turn safely based on at least one of the image around the vehicle, the ultrasonic sensor data, or the traffic light information in response to a prediction that the vehicle will make the right turn at the intersection;

in response to the prediction that the vehicle will make the right turn at the intersection, determining that the vehicle is unable to make the right turn safely in response to an identification of a pedestrian traffic light corresponding to a crosswalk located at the intersection being scheduled to turn on a walk signal during a predetermined period immediately before the vehicle will enter the intersection until immediately after the vehicle will exit the intersection based on the traffic light information; and controlling the vehicle according to a determination of whether the vehicle is able to make the right turn safely.

12. The method of claim 11, wherein predicting whether the vehicle will make the right turn at the intersection comprises:

determining whether the vehicle will enter the intersection based on at least one of the map information or the location information;

in response to a determination that the vehicle will enter the intersection, determining whether the vehicle travels in a right turn lane based on the image around the vehicle; and in response to a determination that the vehicle travels in the right turn lane, predicting that the vehicle will make the right turn at the intersection.

13. The method of claim 12, wherein determining whether the vehicle travels in the right turn lane comprises determining that the vehicle travels in the right turn lane in response to a determination that there is one of a sidewalk on a right side of the vehicle or a roadside zone on the right side of the vehicle based on the image around the vehicle.

14. The method of claim 13, wherein determining whether the vehicle travels in the right turn lane comprises determining that there is the sidewalk on the right side of the vehicle in response to an identification of a curbstone at the right side of the vehicle based on the image around the vehicle.

15. The method of claim 13, wherein determining whether the vehicle travels in the right turn lane comprises determining that there is the roadside zone on the right side of the vehicle in response to an identification of a safety sign concerning safety of a pedestrian at the right side of the vehicle.

16. The method of claim 15, wherein the safety sign comprises at least one of a solid yellow line, a solid white line, or a bicycle road marking.

17. The method of claim 11, wherein
controlling the vehicle comprises controlling the vehicle to be stopped before the vehicle enters the crosswalk.

18. The method of claim 11, wherein, in response to the prediction that the vehicle will make the right turn at the intersection and in response to the identification of the pedestrian traffic light not being scheduled to turn on the walk signal during the predetermined period immediately before the vehicle will enter the intersection until immediately after the vehicle will exit the intersection, determining whether the vehicle is able to make the right turn safely comprises determining whether there is a pedestrian on a sidewalk on a right side of the vehicle or on a roadside zone on the right side of the vehicle based on the image around the vehicle.

19. The method of claim 18, wherein determining whether the vehicle is able to make the right turn safely comprises:

calculating a relative speed between the vehicle and the pedestrian based on the ultrasonic sensor data; and determining whether the vehicle will collide with the pedestrian based on the relative speed.

20. The method of claim 19, wherein:

determining whether the vehicle is able to make the right turn safely further comprises determining that the vehicle is unable to make the right turn safely in response to a determination that the vehicle will collide with the pedestrian; and controlling comprises controlling the vehicle to be stopped before the vehicle enters the crosswalk.

* * * * *